(No Model.)
R. M. HUNTER.
ELECTRICAL MEASURING INSTRUMENT.
No. 502,077. Patented July 25, 1893.
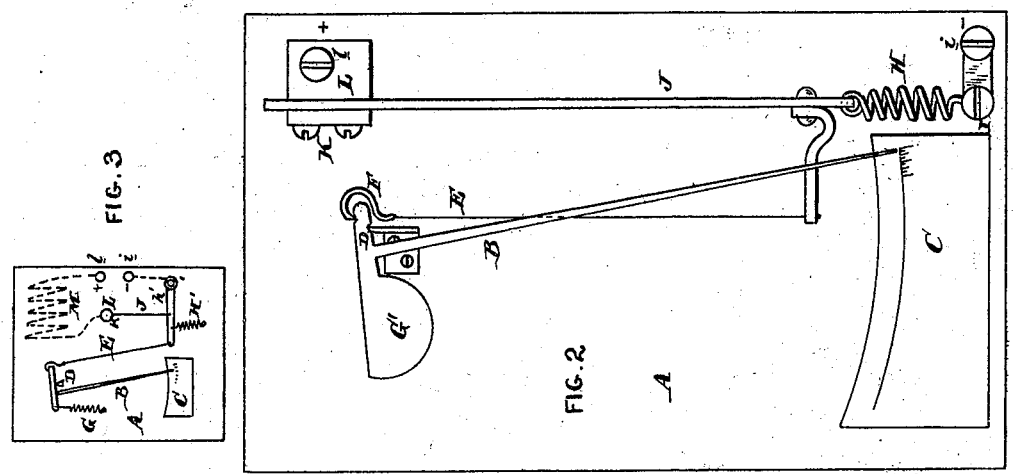
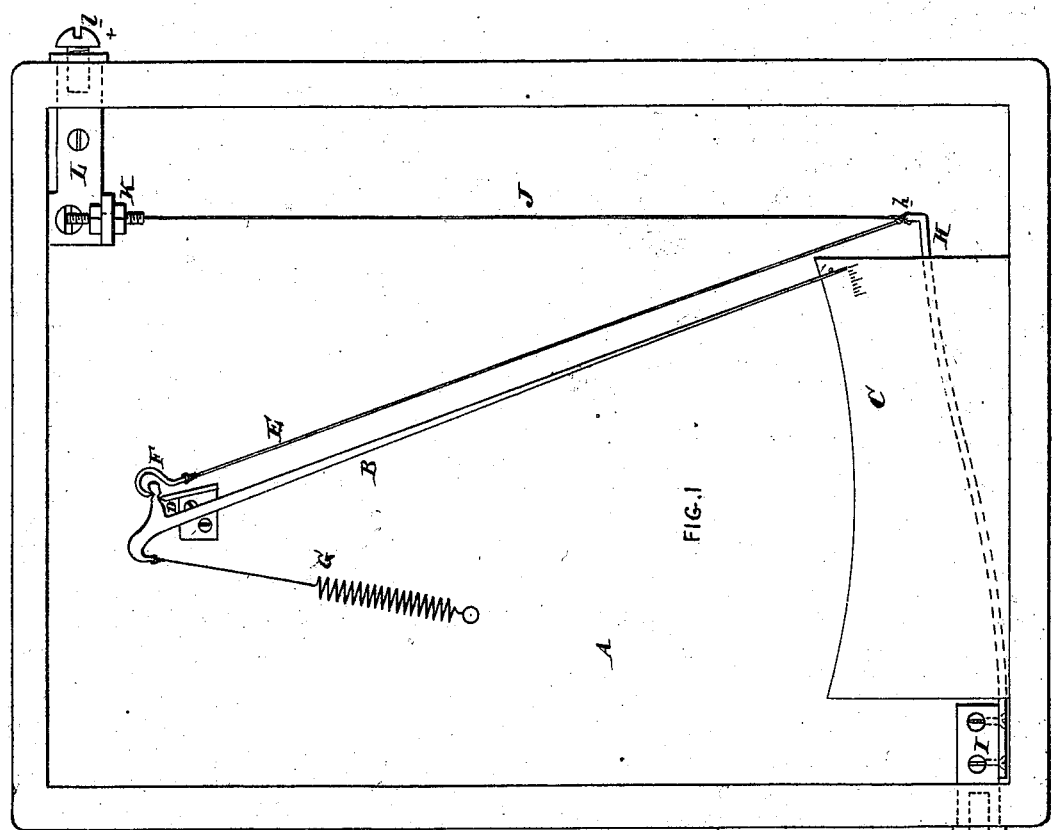
Attest
Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRICAL MEASURING-INSTRUMENT.

SPECIFICATION forming part of Letters Patent No. 502,077, dated July 25, 1893.

Application filed March 28, 1893. Serial No. 467,989. (No model.)

*To all whom it may concern:*

Be it known that I, RUDOLPH M. HUNTER, of the city and county of Philadelphia and State of Pennsylvania, have invented an Improvement in Electrical Measuring-Instruments, of which the following is a specification.

My invention has reference to electrical measuring instruments, and consists of certain improvements which are fully set forth in the following specification and shown in the accompanying drawings which form a part thereof.

This application, Case No. 246, comprehends certain improvements in electrical measuring instruments which employ an expansible conductor as the means for operating the pointer or indicator.

In carrying out my invention I provide two expansible bodies one of which is designed to be expanded positively under the application of an electric current, and the other of which is adapted to expand alone under various atmospheric temperatures for the purpose of compensation, whereby when no current is passing the pointer will remain at zero for any variations of the temperature of the surrounding atmosphere. The expansible bodies may be formed of wire or plates, or combinations thereof.

My invention more specifically considered, is designed as an improvement upon the electrical measuring instruments set out in my application, Serial No. 452,123, filed November 16, 1892, and employs a construction in which the expansible body over which the electric current passes is so located and connected with respect to the movable pointer or needle that no current is caused to pass through the pivots or knife edges of the pointer or those parts which work in direct connection with it.

Referring to the drawings: Figure 1 is a front elevation of an electrical measuring instrument embodying my invention. Fig. 2 is a similar view of a modified form of same; and Fig. 3 is a similar view of another modification thereof.

A is the main case or frame of the instrument.

B is a pivoted pointer fulcrumed upon a stationary knife edge at D, and held to the zero point by a spring G which may be replaced by a weight G' as shown in Fig. 2, if so desired.

E is an expansible body preferably in the form of a fine wire provided at the top with a knife edge F working upon a fulcrum groove in the heel of the pointer B. The lower end of this wire is connected at $h$ to a spring H in any suitable manner.

J is a second expansible body, which may also be a fine wire if the current to traverse the instrument is small as is the case in measuring volts, and this wire is also connected to the spring H, preferably adjacent to the connection of the wire E. The upper end of the wire J is connected with a frame L by an adjustable device K.

$l$ is a clamping screw for connecting the terminal of the circuit to the frame L. The spring H is connected to the frame I which also is provided with a binding screw $i$ for connection with the other terminal of the electric circuit.

C is the scale or dial plate.

The operation of this instrument will now be readily understood. When the current passes in at $l$ it traverses the wire J and emerges through the spring H and the binding posts $i$. As the wire J expands, the spring H has its end $h$ lowered, and this action through the wire E causes the pointer B to traverse a scale C. The spring G opposes the action of the spring H but is preferably much inferior to it, and consequently it operates only to compensate for the movements of the spring H. If the pointer B is weighted as at G' in Fig. 2, the spring G may be dispensed with. I prefer, however, to use it as it holds the pointer B more positively to its fulcrum. By this construction it will be observed that the electric current does not traverse the wire E at any time, and therefore the pivot points connecting with the pointer are not subjected to the injurious effects of a passing current. For ordinary variations in temperature the wires E and J expand or contract to an equal degree as they are of the same length and of the same material, and consequently the pointer E does not move for such variations in the length of the expansion wire J as would result from such changes of atmospheric temperature. It is quite evident that the expansion bodies E and J may be of entirely different metals or alloys, or combinations of metal so that the relative lengths might be materially varied and still the instrument be accurate in its operation. For ordinary purposes it is far more satisfactory to use the same metal in both expansible bodies, such as hard drawn German silver. I do not confine myself to any special kind of metal for these parts.

The construction shown in Fig. 2 is more especially adapted to measure amperes, and has the expansible body J made of a flat bar of metal clamped to the block L by an adjustable device K. The lower end of this bar J is connected with the part I by a heavy spring II, and this is connected to the terminal $i$. The bar J is provided with a laterally extended arm riveted thereto, and this arm is connected by a fine wire E with the pointer B as before. The lateral arm enables the wire E to be considerably removed from the bar J and thereby not be affected by the surrounding temperature due to the passing of the current through the said bar J. It is quite evident that in place of the coil spring shown at H the flat spring indicated in Fig. 1 may be employed.

In the construction shown in Fig. 3 I have the expansible bodies E and J connected to a pivoted arm $h'$, and said arm is drawn downward by a spring H'. In this figure the expansion wire J is shown as half the length of the wire E, but it will also be observed that its leverage on $h'$ is only one half that of the wire E. Consequently the instrument is self compensating under the assumption that the co-efficient of expansion of the parts E and J are the same. If the co-efficients of expansion of these expansible bodies differ, it is then only necessary to vary the length of the expansible body J, or change the relative leverages of the parts E and J with respect to the pivoted arm $h'$. In this figure, M represents the resistance coil which is arranged in the back of the instrument and is employed in those instruments which are especially adapted to measure the potential or volts, and where but a small current is desired to pass over the expansion wire. Such a resistance may also be employed in the constructions shown in Figs. 1 and 2.

I do not confine myself to the mere details of construction as they may be modified in various ways without departing from the principles of my invention.

What I claim as new, and desire to secure by Letters Patent, is—

1. In an electrical measuring instrument, the combination of a movable pointer, an expansion wire through which an electric current passes, a spring connecting with one end of the expansion wire to move it when expanded, and a connecting wire also operated by the said spring and connecting with the pointer whereby the latter is moved in accordance with variations in the length of the expansion wire.

2. In an electrical measuring instrument, the combination of a movable pointer, an expansion wire through which an electric current passes, a spring connecting with one end of the expansion wire to move it when expanded, a connecting wire also operated by the said spring and connecting with the pointer whereby the latter is moved in accordance with variations in the length of the expansion wire, and means to adjust the expansion wire.

3. In an electrical measuring instrument, the combination of a movable pointer, an expansion wire over which the electric current to be measured passes, a spring connecting with one end of the expansion wire for keeping it under tension, a mechanical connection between said spring and the movable pointer over which no current passes to cause the pointer to move under any movement of the spring.

4. In an electrical measuring instrument, the combination of a movable pointer, an expansion wire over which the electric current to be measured passes, a spring connecting with one end of the expansion wire for keeping it under tension, a mechanical connection between said spring and the movable pointer over which no current passes to cause the pointer to move under any movement of the spring, and means to adjust the position of the end of the spring which connects with the expansion wire whereby the pointer may be adjusted.

5. In an electrical measuring instrument, the combination of a dial plate, a movable pointer adapted to move over the dial plate, a spring or weight to oppose the movement of the pointer, an expansion wire maintained under tension, and over which an electric current to be measured is passed, a spring to maintain the said expansion wire under tension, and a mechanical connection between the said spring and the movable pointer whereby when the expansion wire expands the spring connecting therewith shall move the pointer in opposition to the first mentioned spring.

6. In an instrument for measuring electric currents, the combination of an expansible body over which the electric current to be measured passes, a spring to keep the expansible body under tension, a movable pointer, and a compensating mechanical connection over which no current passes between the pointer and expansible body, whereby the pointer will not move for variations in temperature of the surrounding atmosphere.

In testimony of which invention I have hereunto set my hand.

R. M. HUNTER.

Witnesses:
ERNEST HOWARD HUNTER,
HELEN L. MOTHERWELL.